United States Patent
Pirastu

(10) Patent No.: US 7,909,518 B2
(45) Date of Patent: Mar. 22, 2011

(54) OPTICAL ASSEMBLY CONNECTING A LASER WITH OPTICAL FIBRE

(75) Inventor: Alessio Pirastu, Milan (IT)

(73) Assignee: PGT Photonics S.p.A., Milan (IT)

( * ) Notice: Subject to any disclaimer, the term of this patent is extended or adjusted under 35 U.S.C. 154(b) by 348 days.

(21) Appl. No.: 12/085,323

(22) PCT Filed: Dec. 7, 2005

(86) PCT No.: PCT/EP2005/013110
§ 371 (c)(1),
(2), (4) Date: May 21, 2008

(87) PCT Pub. No.: WO2007/065457
PCT Pub. Date: Jun. 14, 2007

(65) Prior Publication Data
US 2009/0136178 A1   May 28, 2009

(51) Int. Cl.
*G02B 6/36* (2006.01)
(52) U.S. Cl. ............... 385/93; 385/53; 385/88; 385/92
(58) Field of Classification Search .............. 385/53, 385/88, 92, 93
See application file for complete search history.

(56) References Cited

U.S. PATENT DOCUMENTS

| | | | |
|---|---|---|---|
| 6,362,919 B1 * | 3/2002 | Flanders | 359/497 |
| 6,526,071 B1 | 2/2003 | Zorabedian et al. | |
| 6,702,476 B2 | 3/2004 | Bergmann et al. | |
| 6,718,088 B2 * | 4/2004 | Okazaki et al. | 385/27 |
| 2005/0123249 A1 * | 6/2005 | Yun et al. | 385/88 |

FOREIGN PATENT DOCUMENTS

| | | |
|---|---|---|
| EP | 0 123 237 A1 | 10/1984 |
| EP | 0 210 921 A1 | 2/1987 |
| EP | 0 712 017 A2 | 5/1996 |
| EP | 10-247741 | 9/1998 |
| JP | 56-113111 | 9/1981 |
| JP | 63-311314 | 12/1988 |
| JP | 9-15447 | 1/1997 |
| JP | 2004-77985 | 3/2004 |
| WO | WO 02/27365 A1 | 4/2002 |
| WO | WO 02/42816 A2 | 5/2002 |
| WO | WO 2005/041371 A1 | 5/2005 |

* cited by examiner

*Primary Examiner* — Jennifer Doan
(74) *Attorney, Agent, or Firm* — Finnegan Henderson Farabow Garrett & Dunner LLP

(57) ABSTRACT

An optical assembly includes an optical package having a wall with an aperture and includes a laser device capable of emitting a laser beam through the aperture and a collimator including a sleeve defining a first and a second end, the collimator including a terminating portion of an optical fiber. In addition, the assembly includes a joint element having a first and a second surface, the first surface contacting the wall around the aperture in a first contact area, and the second surface including a convex surface contacting a portion of the surface of the sleeve in correspondence of its first end in a second contact area, the convex surface being at least partially inserted in the sleeve, so that the collimator is aligned with respect to the laser beam.

26 Claims, 7 Drawing Sheets

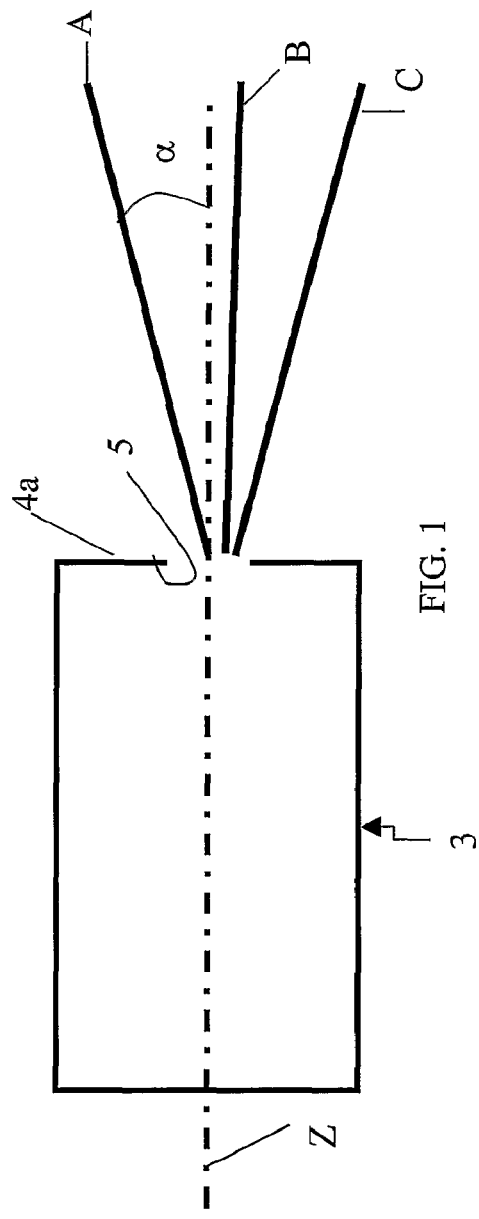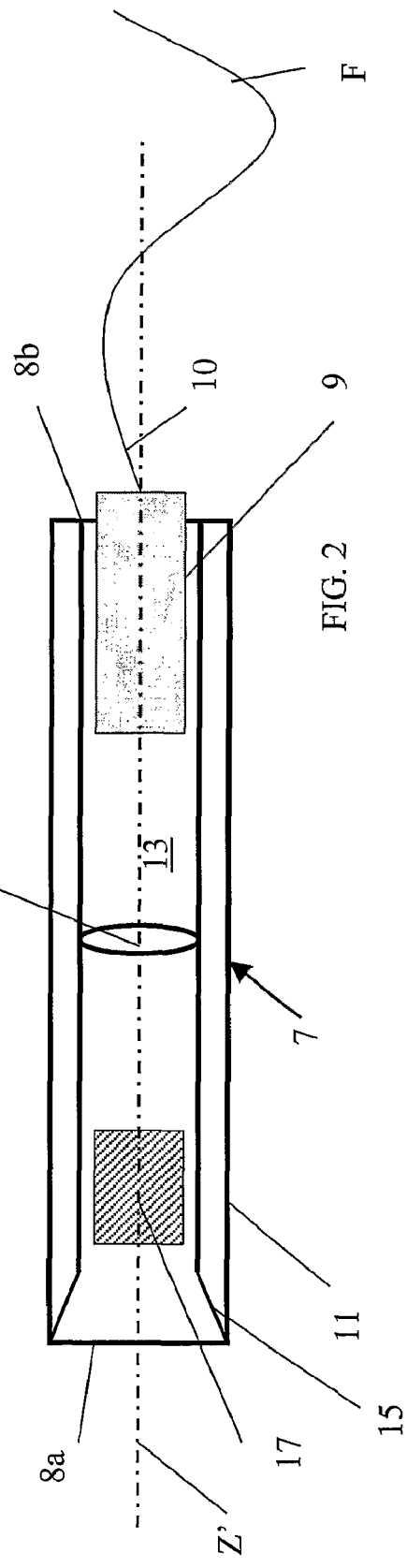

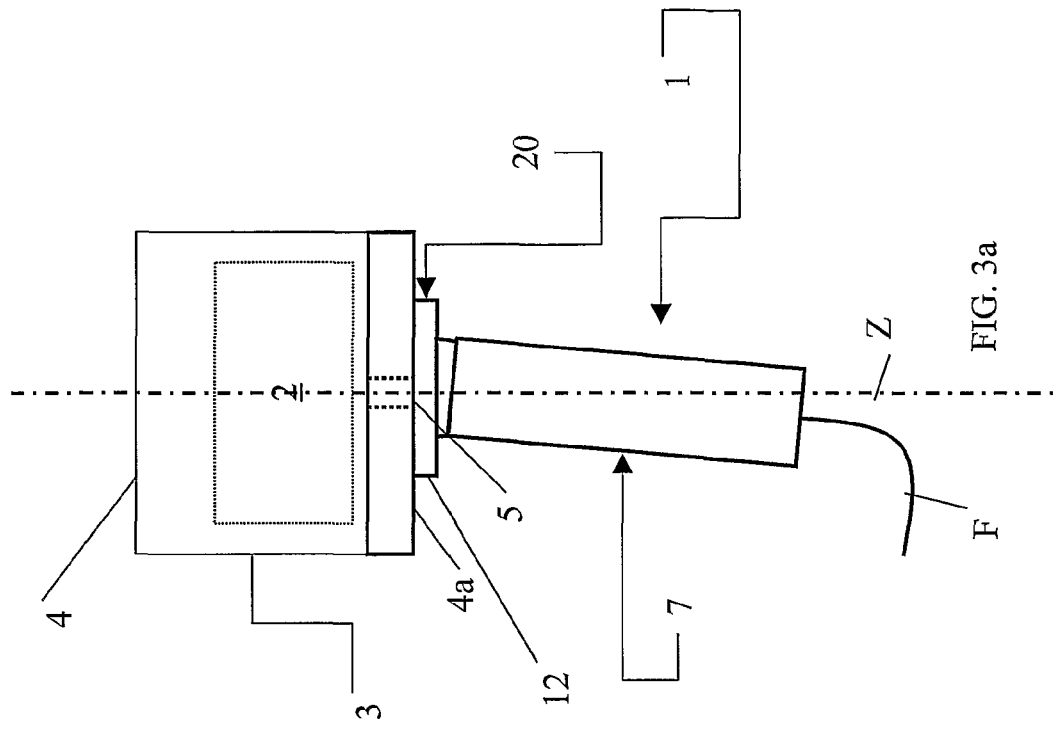
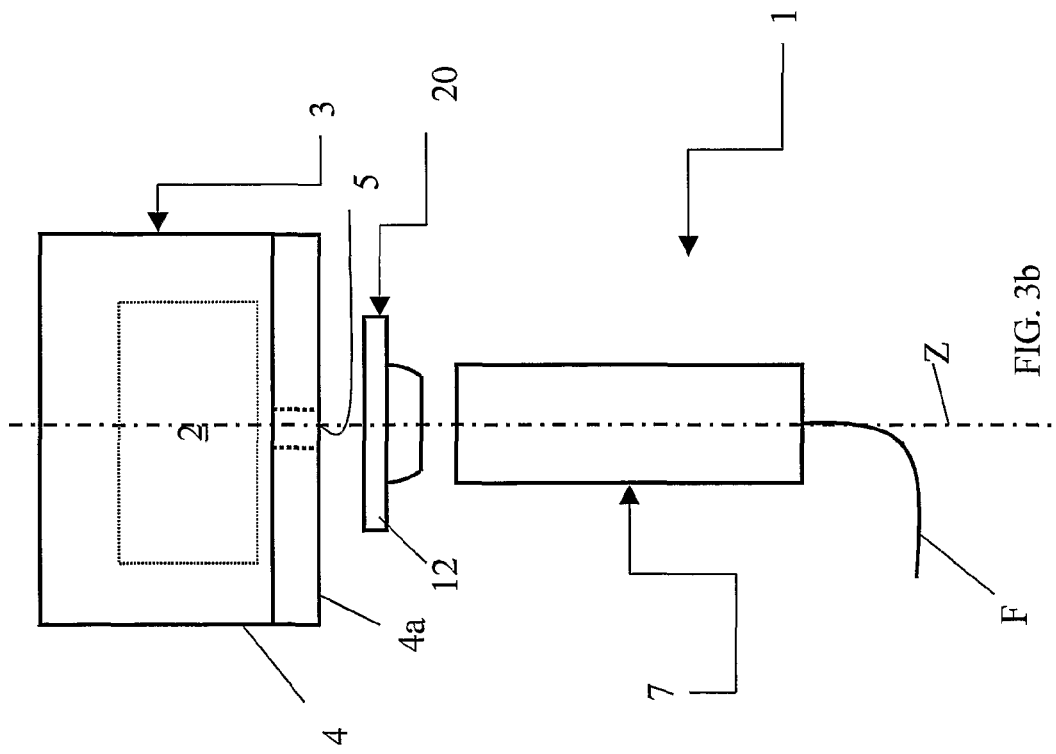

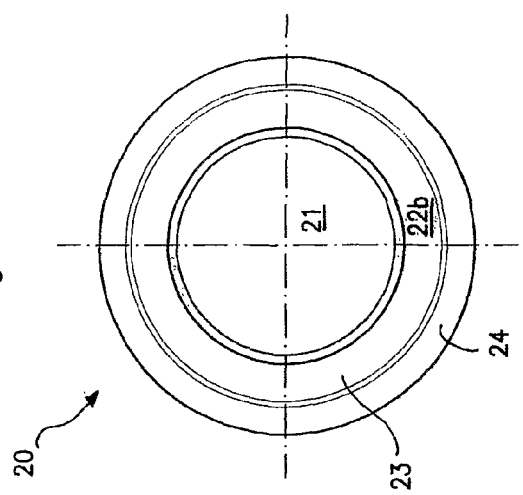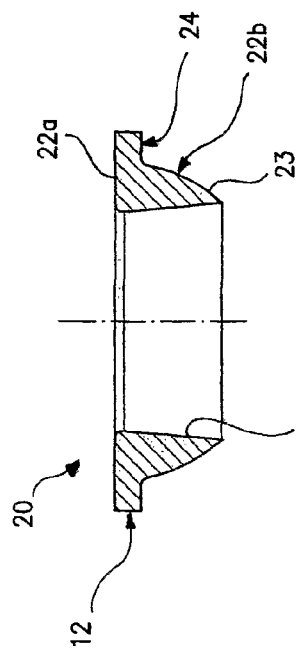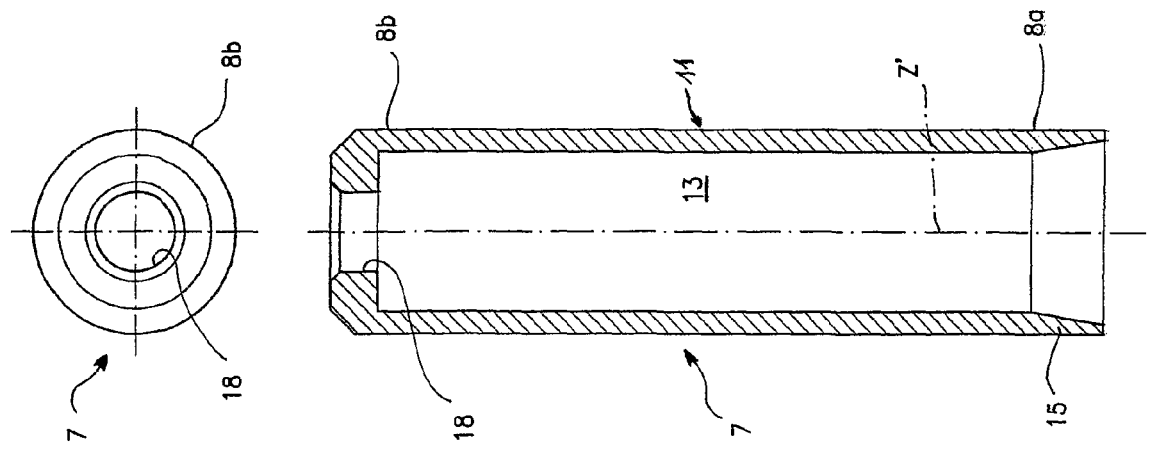

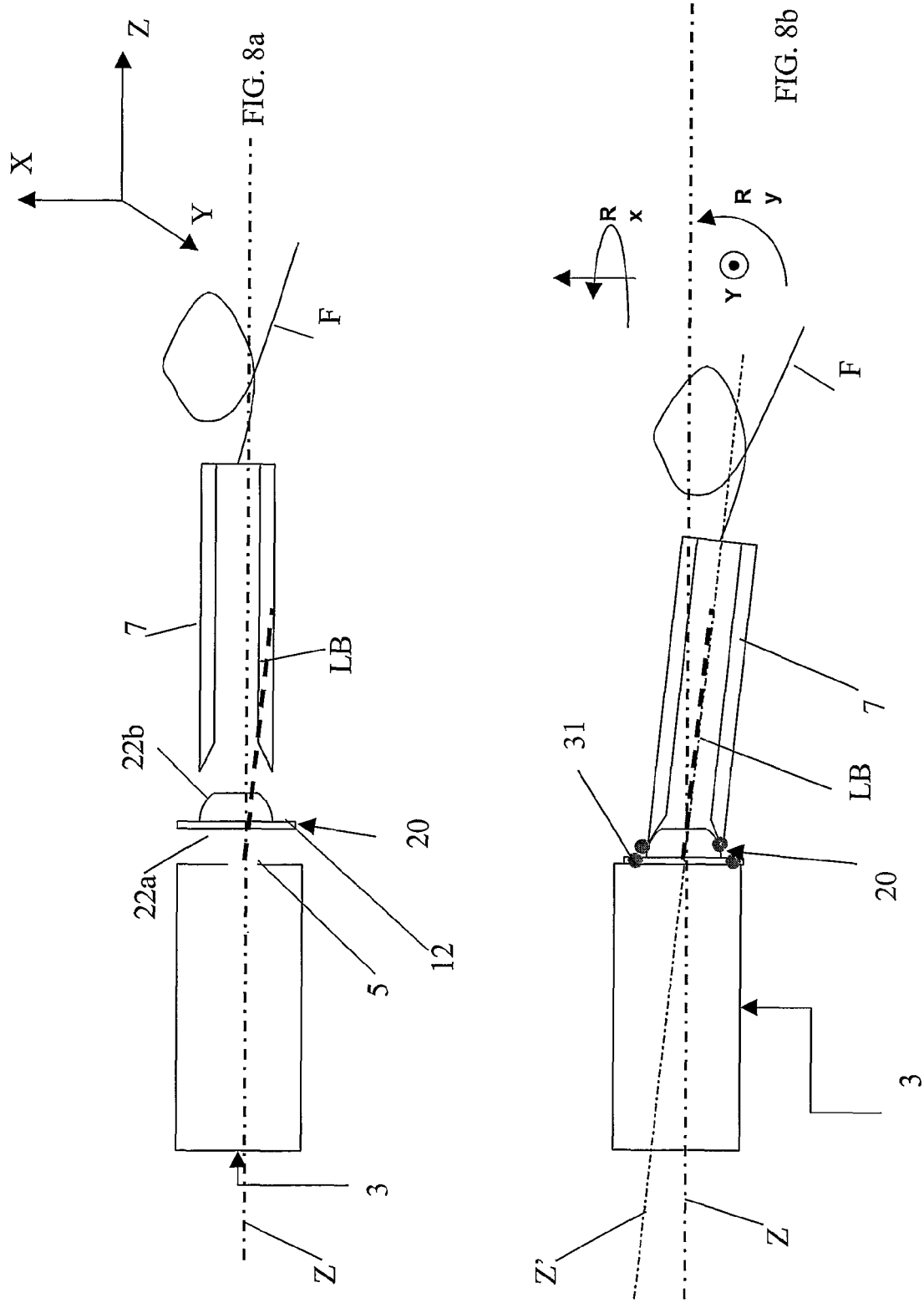

OPTICAL ASSEMBLY CONNECTING A LASER WITH OPTICAL FIBRE

CROSS REFERENCE TO RELATED APPLICATION

This application is a national phase application based on PCT/EP2005/013110, filed Dec. 7, 2005, the content of which is incorporated herein by reference.

TECHNICAL FIELD

The present invention relates to an optical assembly in which one or more signals are coupled between an optoelectronic device such as a laser and an optical fibre, more particularly to an optical assembly which allows an improved connection between an optical package from which a laser beam emerges and a transmission fibre.

TECHNOLOGICAL BACKGROUND

One of the most important considerations in designing an optoelectronic system is the connection between circuit components such as integrated circuits or optoelectronic devices with purely optical components such as waveguides. Optoelectronic devices such as lasers need be optically coupled to fibers to engage in optical fiber communications. High performance optoelectronic devices are generally assembled in optical packages, e.g., butterfly packages, including a housing. These package housings have an aperture in one of their walls from which the optical beam generated by the laser emerges. The beam propagates through free space within the package and exits from the package aperture to couple to an optical fibre. In telecommunications, the beam generated by a laser device, typically a semiconductor laser diode, needs to be coupled to a transmission optical fibre, which for most applications in telecommunications is a single-mode optical fibre.

External-cavity laser systems including a gain medium (typically a semiconductor laser diode) and optical components that collimate the emitted optical beam and select the wavelength to be transmitted are advantageously employed as transmitters in WDM systems.

U.S. Pat. No. 6,526,071 describes an external-cavity tunable laser that can be utilized in telecom applications to generate the centre wavelengths for any channel on the International Telecommunications Union (ITU) grid. The disclosed tunable laser includes a gain medium, a grid generator and a channel selector, both grid generator and channel selector being located in the optical path of the beam. The grid generator selects periodic longitudinal modes of the cavity at intervals corresponding to the channel spacing and rejects neighbouring modes. The channel selector selects a channel within the wavelength grid and rejects other channels. The grid generator is dimensioned to have a free spectral range (FSR) corresponding to the spacing between gridlines of a selected wavelength grid (an ITU grid) and the channel selector is dimensioned to have a FSR broader than that of the grid generator which is itself broader than the FSR of the cavity.

An external cavity tunable laser with a FP etalon as grid generator and an LC-based tunable mirror is described in WO patent application No. 2005/041371. Active alignment is usually employed to align the fibre with respect to the laser. After the fibre is actively aligned to the laser, the alignment process is completed by mounting its ferrule or other fibre housing to a laser housing, such as a TO-can package, by a variety of techniques such as laser welding, or by using an appropriate adhesive such as epoxy or glue. In the coupling of the laser beam to a transmission fibre, it is desired to optimize the power transfer efficiency and component alignment tolerances.

The coupling between a laser device and a fibre can be realized inside of the package in which the laser is contained (i.e. the fibre is located directly in front of the chip). Therefore, in order to make this connection, some free space has to be left in the package and additional optical elements are difficult to place there between.

The connection between the laser and the fibre can also be realized by using a connecting assembly known as "collimator" which has to be aligned to the collimated laser beam path and then fixed to the packaging in which the laser is contained. The collimator is designed to focus a collimated laser beam to an end of an optical fibre. Typically, a collimator is a pre-assembled assembly including an optical fibre termination, with a fibre end, and a lens that is positioned and fixed relative to the fibre termination prior to attachment to the device package, so that an optical beam of approximately constant cross-section, i.e., a collimated beam, can be coupled to or from the fibre. Generally, the lens and the optical fibre termination are fixed inside a cylindrical metallic sleeve. Additional optional optical elements can also be present in the collimator. Alternatively, the different components included in the collimator may be assembled using laser welding when the collimator is aligned in front of the package. This technique, which requires a collimated beam emerging from the package, includes the step of positioning a focussing lens in front of the laser beam through a step of active alignment, so that, the optical axis of the beam exiting the package lies substantially perpendicular, e.g., within 0.5° from the perpendicular axis, to the package wall containing the aperture from which the beam emerges.

The fibre is then to be assembled: a sleeve in which a ferrule is contained is actively aligned to the holder and then the ferrule is fixed, optimizing the position of the fibre with respect to the focal point of the lens. Post-welding alignment may also be necessary. Alternatively, a simultaneous alignment of all elements (sleeve, holder and ferrule) may be possible, provided that a suitable workstation is available. Workstations especially designed to fabricate assemblies including a package and a collimator using the above technique are sold for example by ELS Elektronik Laser System GmbH or by Moritex USA Inc, the respective products' names being "Versaweld" and "FZ-80".

The U.S. Pat. No. 6,702,476 in the name of Agere Systems Inc. and Triquint Technology Holding Co. describes a fibre optic device and a method of assembly the fibre optic device to provide at least four degrees of adjustment between an optical fibre and bulk optics in an optical device package. At an opening in the wall of the optical processor package, a washer-like structure allows initially adjustable contact at a flat surface thereof and at a spherical curved surface thereof. One of the surfaces bears against the wall about the opening and the other surface bears against a contact feature of a connecting assembly, typically a pre-assembled collimator assembly, which holds a termination portion of the optical fibre. Translational adjustment is made at the flat surface and tilting adjusting is made at the curved surface before final attachment at both surfaces. The fibre optic device is thus aligned with the optical device package and, through that package, can be aligned with another connecting assembly that is initially fixed in place at another opening of the optical device package. Circumferential tapers are provided at the appropriate ones of the surfaces, the wall, and the contact feature to facilitate adhesive flow for final attachment. After adhesive placement, it is UV-tacked and heat curing is subsequently performed.

Japanese patent application No. 09-015447 in the name of Oki Electric Ind. Co. LTD discloses a structure and method for fixing optical fibre collimator, so that stable characteristic is kept. An annular fixing and coupling member having a through-hole in the centre is allowed to intervene between the optical fibre collimator constituted by attaching an optical fibre and an optical lens in a sleeve so that their optical axes may be aligned and the optical functional part so as to be nearly aligned with the optical axis of the optical functional part, and a spherical surface and a spherical receiving part are positioned between the collimator and the member, and the spherical surface and an edge part are allowed to abut and coupled and fixed by welding.

Japanese patent application No. 2004-077985 in the name of Japan Aviation Electronics Industry Ltd shows an optical module for aligning optical element e.g. light modulator, optical fibre, adjusts projection angle of light which irradiates optical fibre holder and optical element. The spherical surfaces of optical fibre aligning saddle and fibre aligning welding saddle acts as an adjustment unit. The adjustment unit adjusts the projection angle of light which irradiates an optical fibre holder and an optical element e.g. a light modulator.

SUMMARY OF THE INVENTION

The present invention relates to an optical assembly including a laser device and an optical fibre, which allows an improved connection between the two elements. An additional goal of the invention is to realize such an optical assembly the overall costs of which is relatively low.

The Applicants have first considered a collimator including a sleeve, one end of the sleeve having the form of a convex spherical surface. Said collimator could be mated to a coupling member having a truncated-conical shape. Applicants have however realised that a collimator having a sleeve including a spherical surface requires the fabrication of an especially designed collimator (standard commercial collimators are not produced with a spherical surface), thus increasing fabrication costs. In addition, such a coupling geometry does not allow post-welding adjustment, for example a laser hammering process, in order to compensate post-weld shifts.

An increase in the assembly cost and complexity would also originate from the realization of two curved surfaces, such as in the combination of a concave and convex surface, which have to match exactly because of the very low optical tolerances, e.g., of the order of few millirad.

Additionally, Applicants have observed that using adhesive materials to join the different elements of the optical assembly may yield drawbacks. First of all, adhesives which well adhere on metals and at the same time have a low shrinkage during polymerization are rare. In addition, a thermal annealing process is necessary to obtain an adequate polymerization. However, this process requires high temperatures which may damage the assembly. Since many adhesive are also vapor-permeable, to obtain a hermetic optical assembly, sealing windows need to be introduced in the assembly, thereby increasing production costs. If, after polymerization, alignment is lost, there are not suitable alignment-recovering techniques. Furthermore, implementing a process including a phase in which an automatic machine has to distribute the adhesive is extremely demanding: the machine has to contact aligned elements (keeping the alignment) and achieve a high precision. In addition, the overall mechanical resistance and time reliability is not guaranteed.

According to the invention, the optical assembly includes an optical device package that houses a laser device capable of emitting a laser beam and optionally the optical components which may be necessary to modify the optical path or the optical spectrum (e.g., to deviate the beam or select its wavelength) of the beam itself. The package may include other internal elements, such as electronic devices and other sub-assemblies.

Any kind of laser may be used in the assembly of the present invention. According to a preferred embodiment, a tunable laser is envisaged. More preferably, an external cavity tunable laser system is employed. Preferably, the laser is configured to emit an output radiation at a selected one of a plurality of equally spaced output frequencies that match the ITU channel grid.

According to a preferred embodiment of the invention, the external-cavity tunable laser includes a gain medium and a tunable mirror. Preferably, the tunable mirror is in thermal contact with a thermally conductive platform. Preferably, also the gain medium is in thermal contact with a thermally conductive platform. According to a first preferred embodiment, the tunable mirror is laid substantially horizontally with respect to the thermally conductive platform. According to a second preferred embodiment, the tunable mirror is mounted substantially perpendicularly to the optical beam emitted from the gain medium.

The package, which is for instance realized in a metallic material such as steel, presents at least an aperture on one of its outer walls so that the laser beam may propagate outside the package itself. Preferred outer wall geometries define a cylindrical or box-like enclosure, having a main longitudinal axis along which the aperture is present. Preferably, the main longitudinal axis is substantially orthogonal to the package housing wall having the aperture from which the beam emerges.

An example of a suitable package is a standard commercial 14-pin butterfly metal ceramic package.

Applicants have observed that the laser light beam, which is preferably a collimated beam, e.g., a collimating lens is present in the interior of the package, may exit from the optical device package at different locations and with different angles with respect to the longitudinal axis of the package. In FIG. 1, a schematic view of possible paths of laser beams A,B,C radiating from the package is shown by way of an example. The emerging angle α is the angle between the main longitudinal axis, Z, of the package and the beam. These angular variations of the output beam can be the result of an alignment condition of the different optical components present in the package and their respective positioning within the aperture.

In fact, the optical components present in the package, such as the optical components forming an external-cavity laser, may need to be carefully aligned and acceptable tolerances are extremely low. Therefore, it is often not possible to impose stringent requirements in the positioning and angle of the emerging beam with respect to the Z axis (e.g., the emerging beam being centered within the aperture and parallel to the Z-axis within a few tenths of a degree) since this may lead to even more severe tolerances in the package construction, thereby increasing manufacturing complexity and costs.

It is thus necessary to be able to couple an optical beam emerging from a laser package essentially regardless of its tilting angle, α, (which may be of the order of few degrees) and its position across the package aperture. It follows that the optical fibre needs to "catch" the emerging beam within an angular randomness of a few degrees. Then, the fibre needs to be placed at the right position in a (X,Y) plane perpendicular to the wall from which the beam emerges (i.e. translations of the fibre along the X and Y axis are necessary) and also at the right angle with respect to the Z axis. These angular variations from the Z axis can be described as small rotations around the X and Y axis.

Translational displacements of the fibre with respect to the laser beam along the Z-axis as well as rotations about the same axis typically do not lead to high losses with respect to displacements or rotations about the other two axes, X and Y (in absence of polarization sensitivity). Therefore, a greater precision is needed in the displacements and rotations relative to the X and Y axes.

To realize the mentioned coupling, the optical assembly of the present invention includes a collimator which comprises a sleeve in which the terminating portion of an optical fibre is fixed. Preferably, the fibre is a single-mode transmission optical fibre, more preferably, a Polarization-maintaining and Absorption-reducing Fibre (PANDA).

In addition, in a preferred embodiment of the laser included in the assembly of the present invention, a prism is present after the collimating lens along the beam path outside the laser cavity. The prism is used to change the angle of beam propagation, which is tilted with respect of the Z axis in the specific laser configuration. Due to the fact that the preferred laser is a tunable laser, i.e. it emits at different wavelengths, the prism may impart a different angular shift of the beam according to the selected wavelength, due to the chromatic dispersion. Therefore in order to avoid a considerable distortion due to the above-mentioned chromatic dispersion of the channels located at the ends of the wavelength band at which the laser emits, it is important that the excess losses of the coupling between laser and fibre are minimized.

Applicants have noticed that a step-by-step assembly of a collimator (i.e., the use of a collimator that is not pre-assembled before alignment with the optoelectronic device) in front of the aperture in the package from which the beam emerges requires that the tilting angle α of the emerging beam be comprised between $-0.5°$ and $0.5°$, since higher angles would lead to very low coupling efficiency, thus influencing the optical package design and lowering the internal aligning tolerances. In addition, due to the plurality of different process steps, the whole optical assembly process is rather complex, taking also into account that different tools dedicated to each specific process phase would be needed to be used. The overall cost of the final product, and its production time, is therefore relatively high.

According to a preferred embodiment of the invention, a pre-assembled collimator is used, i.e., the components forming the collimator are assembled at a stage prior to the alignment stage of the collimator to the optoelectronic device.

The collimator includes a sleeve having a main longitudinal axis, Z', and defining a first and a second end, to the latter of which a pigtail (i.e., termination portion) of the transmitting fibre is connected, preferably through a ferrule. The sleeve is preferably cylindrical.

Due to the angular randomness of the optical beam emerging from the package, the main longitudinal axis, Z, of the package and the main longitudinal axis, Z', of the collimator need not to be coincident or even parallel to each other.

The collimator also includes a lens, disposed between the first and the second end of the sleeve, which is configured to couple optical signals with the ferrule. Many different types of lenses known in the art may be employed in the present invention, aspherical lenses or GRIN lenses are possible examples.

Optionally, the collimator preferably includes an optical isolator, located in the cylindrical sleeve between the first and the second end, which prevents back-reflected light being passed back into the laser cavity and which may reduce the laser beam power in case it exceeds a given threshold.

Preferably, the collimator is fabricated according to standard techniques and materials (such as stainless steel) known in the art, so that fabrication costs are minimized.

Applicants have observed that angular tolerances of the order of less than a millirad around the optimal aligned position do not allow the direct welding of the collimator onto the package wall. For instance, the direct welding of a collimator cylindrical sleeve on a wall of the package housing would not guarantee the desired accuracy in the alignment and fixing of the collimator on the package.

According to the invention, in order to join the collimator to the package wall, a joint element is provided.

According to the invention, the joint element includes two opposite surfaces, the first of which is brought in contact to the package wall from which the laser beam emerges and the second is in contact with a portion of the surface of the collimator.

The joint element also includes a through-hole through which the laser beam passes. Preferably, the through hole has a larger extension than that of the aperture through which the laser beam emerges, so that it can not interfere with the beam propagation.

More in detail, the first surface of the joint element has a complementary geometry with respect of the outer surface of the wall of the package in which the aperture is realized, i.e. in case of a planar wall, the first surface is substantially planar. A first contact area is thus defined, which is the area of the first surface of the joint element and the corresponding area of the package wall outer surface which are in physical contact.

The second opposite surface of the joint element comprises an outward-facing convex surface, preferably an outward-facing portion of a spherical surface having radius R. A second contact area is thus defined, which is the area of the second surface and the area of the surface of the collimator in which the joint element and the collimator are in abutment. More particularly, the contact is made between a portion of the convex surface and a portion of the surface of the collimator's sleeve in proximity of its first end.

Preferably, the second surface of the joint element comprises both the portion of spherical surface and a planar surface which extends from the boundary of the former. More preferably, this planar surface is an annular surface.

In a preferred embodiment of the invention, the joint element can be seen as comprising two elements: a first element having the shape of a hemisphere mounted on a second element which is essentially a cylindrical flange, and the all structure having a hole in the middle centered on the axis of the hemisphere. In this case, the planar surface of the second surface of the joint element is the external surface of the flange.

The shape and dimensions of the convex surface are such that the first end of the sleeve of the collimator can be partially mated to the convex surface, i.e. a portion of the spherical surface penetrates into the hollow sleeve of the collimator till abutment is achieved. The radius R of curvature of the convex surface is greater than or equal to the radius of the cylindrical sleeve.

Preferably, in order to achieve a better abutment between the collimator sleeve and the curved convex surface (i.e. to achieve a greater second contact area), the collimator sleeve includes a tapered region in correspondence of its first end. More preferably, the inner surface of the sleeve terminates at its first end with a frusto-conical surface, i.e. the inner diameter of the cylinder increases approaching to the first end. This tapered region, or flare, is easily realized using standard techniques in the art. Preferably, the joint element is fixed to the package and collimator through laser welding.

Applicants have realized that with the provision of such a joint element, a very good coupling can be achieved between fibre and laser beam, thanks to the five degrees of freedom provided by the mutual sliding of a portion of the inner surface of the collimator sleeve on the convex surface of the joint element (rotations about the three axes) and the mutual sliding of the first surface on the package wall (translations along the two axes perpendicular to the package main axis). The operation for alignment of the various components of the assembly will be better detailed below.

In addition, due to the geometry of the joint element, the collimator can be a standard pre-assembled collimator as known in the art, without any need of specially designed parts, thus reducing production costs of the overall assembly. In the manufacturing process of the assembly according to the invention, active alignment of the collimator and joint element is carried out. During active alignment, the power transferred to the pigtail is monitored, according to standard techniques in the art.

It is possible to have five degrees of freedom during the alignment thanks to the joint element and collimator mutual geometry. Indeed, the first surface of the joint element may translate along the X and Y directions with respect to the package wall, while the convex curved surface mating the end of the sleeve may rotate along the X, Y and Z axes, sliding one surface on the other. The penetration of the convex surface on the hole defined by the sleeve of the collimator allows a air-gap free abutment.

Preferably, the laser welding process of the present invention comprises two welding steps: the first one welding the first surface of the joint element to the package wall and the second welding the second surface of the joint element to the collimator.

A spot welding technique is preferably used first to weld the joint element on the package and then the collimator on the joint element. For example, a contemporary three-spot welding for each welding step is preferred.

After the two welding phases, if post-welding shift is present, an hammering phase is preferably applied in order to compensate for it.

Additionally, if a sealed assembly is needed, the laser welding tool used for joining the joint element to the package and collimator can be also used to realize sealing of the assembly through low-power welding spot. This step again reduces the overall costs of the assembly because there is no need of extra elements such as sealing windows.

BRIEF DESCRIPTION OF THE DRAWINGS

Further features and advantages of an optical assembly according to the present invention will become more clear from the following detailed description thereof, given with reference to the accompanying drawings, where:

FIG. 1 is a schematic lateral view of a package from which a light beam emerges;

FIG. 2 is a schematic lateral view of a collimator according to the present invention;

FIG. 3a is a schematic lateral view of an assembly according to the teaching of the invention;

FIG. 3b is the assembly of FIG. 3a in an exploded view;

FIGS. 6a and 6b are respectively a top-view and a cross-sectional lateral view of the collimator of FIG. 2;

FIGS. 7a and 7b are respectively a top-view and a cross-sectional lateral view of a joint element used in the assembly of FIGS. 3a and 3b;

FIGS. 8a and 8b represent two steps of the method of the invention to join the different elements of the assembly of FIG. 3a;

PREFERRED EMBODIMENTS OF THE INVENTION

Figure 4:
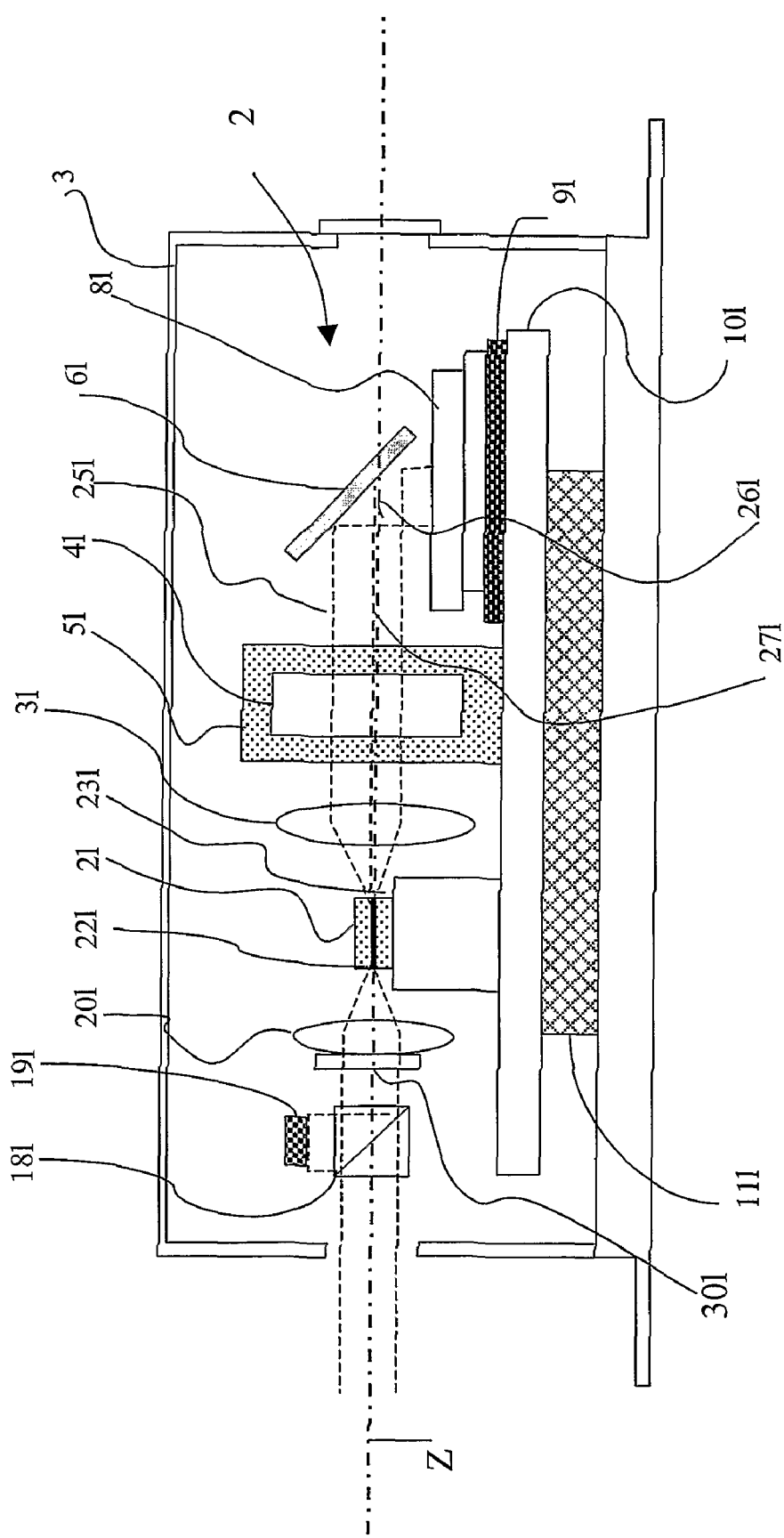
FIG. 4 is a cross-sectional lateral view of a tunable laser included in a preferred embodiment of the assembly of the present invention.

With initial reference to FIGS. 3a and 3b, an optical assembly, globally indicated with 1, in which a laser device 2 is connected to a transmission fibre F according to the teaching of the present invention is schematically depicted. In FIG. 3a the optical assembly 1 is shown in an assembled configuration, while in FIG. 3b the components of the assembly 1 are shown in a partially exploded view.

The optical assembly 1 includes the laser device 2 that fits in a package 3, a collimator 7 which includes the optical transmission fibre F, and a joint element 20 sandwiched between the two.

The package 3 is for example a butterfly package and it comprises external walls 4 containing the internal optics (such as the laser 2) and it preferably has a regular shape with a main longitudinal axis Z. More preferably, the package external walls 4, preferably realized in metallic material, such as stainless steel or Kovar™, define a box-like shape or a cylindrical shape. One of the external walls 4, wall 4a, substantially perpendicular to the Z axis, includes an aperture 5 from which the laser beam generated by the laser device 2 emerges. Other apertures, in addition to aperture 5, can be realized in the package 3 as well. Preferably, the wall 4a containing the aperture 5 is a planar wall defining an outer flat surface ("outer" in the present context indicates that the surface in issue is not facing the internal optics of the package).

Preferably, the laser beam emerging from the package through aperture 5 is a collimated laser beam, i.e. a collimating lens (see for example lenses 31, 201 in FIGS. 4 and 5 respectively and described in the following) is present inside the is package 3. "Collimated" beam means in the present context that the beam cross-section is approximately constant during propagation. Collimation minimizes beam divergence and decreases beam spot size at the target area. It should be understood, however, that exact constant beam cross section can not be maintained due to diffraction effects.

The absence of a collimating lens close to the gain chip 21 (FIGS. 4 and 5) would lead to extremely divergent beam (i.e. a divergence of above 25°) and thus an external collimator would not be sufficient to collect all the radiation. The aperture 5 itself would choke the divergent beam.

In addition to the laser device 2, in the package 3 other active and/or passive elements may be present according to the overall assembly design and configuration.

Any type of laser device can be suitable for the present application. In a preferred embodiment, the laser 3 in an external cavity laser. Even more preferably a tunable laser is employed.

According to a first preferred embodiment of the invention depicted in FIG. 4, the laser device 2 includes a gain medium 2I, a collimating lens 3I, a channel allocation grid element 4I, a deflector 6I and a tunable mirror 8I. The laser 2 comprises a thermally conductive platform 10I. The gain medium 2I is based on a semiconductor diode, for example an InGaAs/InP multiple quantum well Fabry-Perot (FP) gain chip especially designed for external-cavity laser applications. The gain chip comprises a back facet 22I and a front facet 23I. The gain chip's front facet 23I is an intracavity facet and has an anti-reflection coating. Preferably, the gain chip waveguide is bent so that it has an angled incidence on the front facet in order to further reduce back reflections. The back facet 22I is partially reflective and serves as one of the end mirrors of the external cavity. The reflectivity of the back facet can range for instance between 10% and 30% in order to allow a relatively high laser output power.

Within the laser cavity, the emerging beam from the gain chip front facet 23I is collimated by collimating lens 3I that collimates the beam to define an optical path 25I. The collimated beam impinges onto a channel allocation grid element 4I.

The channel allocation grid element 4I is preferably a FP etalon, e.g., a solid or an air-spaced etalon. The laser can be designed in such a way that the operating wavelengths are aligned with the ITU channel grid. In this case, the laser wavelength is centred to the ITU grid via the FP etalon 4I, which is structured and configured to define a plurality of equally spaced transmission peaks. In applications for WDM or DWDM telecommunication systems, transmission peak spacing, i.e., the FSR of the grid element, corresponds to the ITU channel grid, e.g., 200, 100, 50 or 25 GHz.

Preferably, the collimating lens 3I is placed in the cavity substantially orthogonal to the optical path 25I. Preferably, the FP etalon 4I is placed in the cavity with a slight inclination angle, e.g., 0.5°, to the perpendicular to the optical path 25I in order to keep the reflected light of the FP etalon from returning to the laser gain chip.

After the FP etalon 4I, the laser beam strikes a deflector 6I that deflects the beam 25I onto a tunable mirror 8I along optical path 26I. The tunable mirror 8I reflects the light signal back to the deflector 6I, which in turn deflects the light signal back to the gain medium 2I. The deflector 6I is in this embodiment a planar mirror, for Instance a gold-coated silicon slab.

The tunable mirror 8I is an electro-optic element, in which tunability is achieved by using a material with voltage-dependent refractive index, preferably a liquid crystal (LC) material. The tunable mirror serves as the coarse tuning element that discriminates between the peaks of the FP etalon. The laser cavity is a folded resonant cavity having an optical path length, which is the sum of the optical path 25I between the deflector 6I and the back facet 22I of the gain medium and the optical path 26I between the deflector and the tunable mirror 8I.

The laser beam is coupled out of the external cavity by the partially reflective back facet 22I of the laser gain chip 2I. Preferably, a collimating lens 20I can be placed along the optical path of the laser output beam. In the present embodiment, a beam splitter 18I, e.g. a 98%/2% tap, which is placed after lens 20I, picks off a portion of the output light as a test beam, which is directed to a photodetector 19I for power control.

In addition, preferably a prism 30I is located after the lens 20I; "after" is meant with reference to the beam propagation direction. Lens 20I and prism 30I can be mounted on a same mounting structure, not shown in the figure. The prism 30I tilts the propagating direction of the laser beam, in the depicted embodiment of 19.5°, so that the emerging beam propagates approximately along the Z axis. In the preferred embodiments, the laser 2 is designed to produce substantially single longitudinal and, preferably, single-transversal mode radiation. Longitudinal modes refer to the simultaneous lasing at several discrete frequencies within the laser cavity. Transversal modes correspond to the spatial variation in the beam intensity cross section in the transverse direction of the lasing radiation. Generally, an appropriate choice of the gain medium, e.g., a commercially available semiconductor laser diode including a waveguide, guarantees single spatial, or single transversal, mode operation.

The tunable mirror 8I lays substantially horizontally with respect to the principal surface plane of the thermally conductive platform 10I, which is preferably thermally coupled to a thermoelectric cooler (TEC 11I) that provides for the thermal control for the platform.

Figure 5:
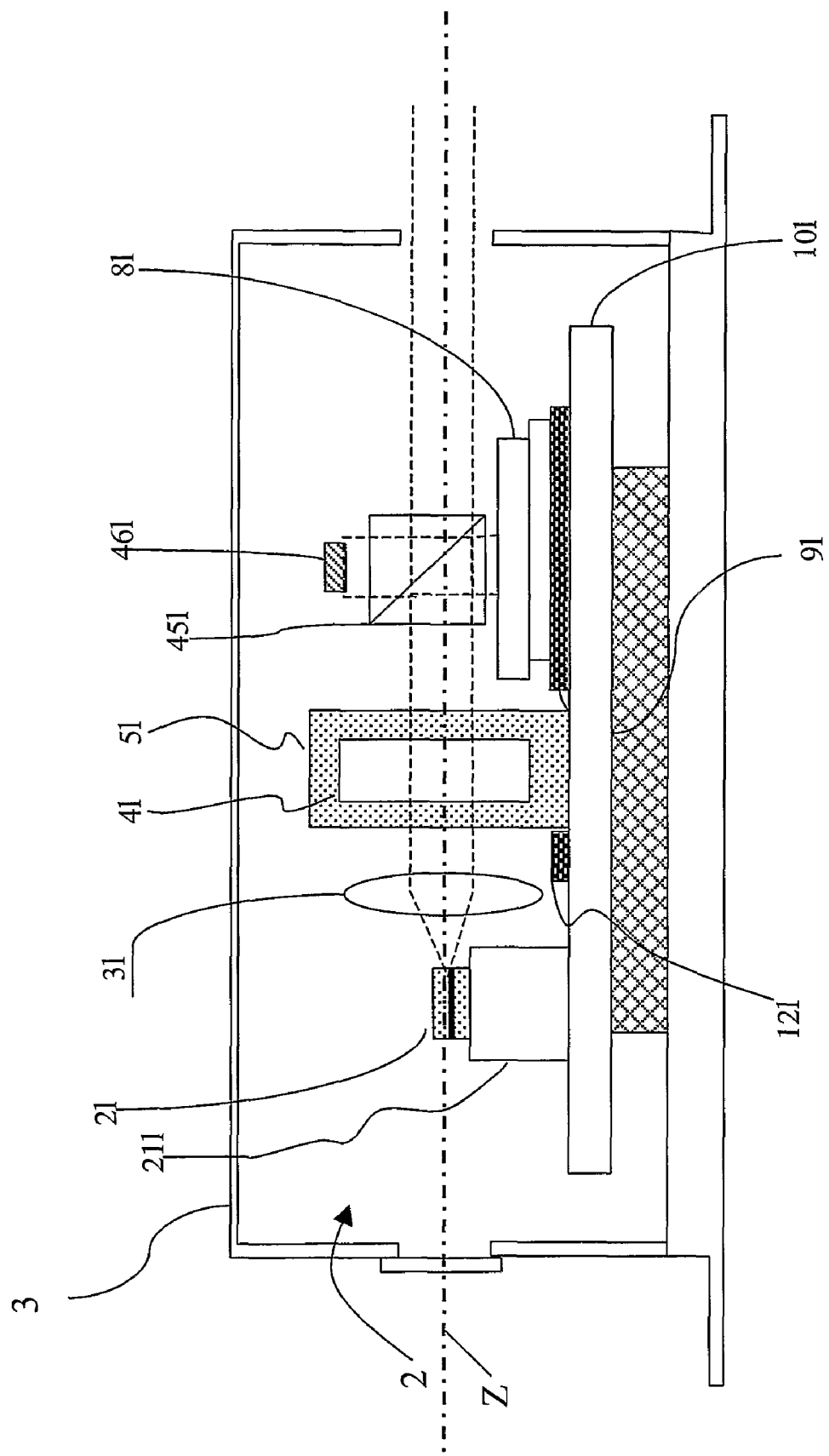
FIG. 5 is a cross-sectional lateral view of a second tunable laser included in an additional preferred embodiment of the assembly of the present invention.

FIG. 5 illustrates a laser 2 according to a second embodiment of the present invention. The same reference numerals are given to elements of the tunable laser corresponding to those shown in FIG. 4 and their detailed explanation will be omitted.

After having passed through the FP etalon 4I, light impinges on the beam splitter (BS) 45I, where it is partially diverted to the tunable mirror 8I. A photodetector 46I receives the portion of the laser light, which has been returned by the tunable mirror to the BS and then transmitted through the BS, as test beam for power monitoring.

The design of the laser cavity according to the embodiment of FIG. 5 has the advantage of improving the compactness of the cavity as a second collimating lens to collimate the output beam to the optical output assembly for the coupling into the optical fibre (lens 20I in FIG. 4) is not necessary. Moreover, if power monitoring is to be realised, a further BS for spilling out the output power is not necessary.

Preferably, in the laser design of FIG. 5, the rear facet of the laser diode has a reflectivity larger than 90% and the front facet with reflectivity lower than $10^{-3}$ in order to minimise gain ripple that can lead to laser emission in non-selected channels.

In addition, another preferred embodiment of a laser device 2 which is preferably included in the assembly 1 of the present invention comprises a tunable mirror positioned within the external cavity substantially perpendicularly to the optical beam.

Referring back to FIGS. 3a and 3b, the assembly 1 also comprises a collimator 7, preferably a pre-assembled collimator, to connect the laser 2 to the transmission fibre F (more in particular with a terminal portion of a fibre F, denominated pigtail 10) achieving a good alignment and minimizing losses. Collimator 7, as shown in FIG. 2, includes an outer sleeve 11, preferably realized in a metallic material (e.g. stainless steel), having a main longitudinal axis Z' and defining a first and a second opposite ends 8a,8b. Preferably, the sleeve 11 is elongated and has a regular shape (i.e. its cross-section on a (X,Y) plane is a circle or a regular polygon), more preferably it is cylindrical.

In FIGS. 6a and 6b, a more detailed example of a collimator's sleeve 11 (the internal optic is not shown) is depicted. According to a preferred embodiment of the invention, which can be better seen in the lateral cross-section of FIG. 6b, the sleeve 11 has a tapered end 8a, i.e. some material forming the sleeve 11 has been removed in correspondence of its first end 8a in order to form internally a flare 15. More preferably, a frusto-conical surface is realized. Preferably, the sleeve inner diameter decreases within a given region going from the end 8a of the sleeve 11 toward the second end 8b.

As an example, preferred dimensions of the collimator 7 are the following: the sleeve is cylindrical, has an external diameter of 4 mm, an internal diameter of 3 mm, and a length of 2 cm.

Preferably, the collimator 7 (see again FIG. 2) further includes a ferrule 9, preferably standard in the art, to protect the stripped end of the fibre F (pigtail 10) to which it is attached. The pigtail 10 is configured so that it transmits optical signals reflected by the collimator 7. Ferrule 9 can be made of glass, plastic, metal, or ceramic material. In the present embodiment, the ferrule 9 is disposed in correspondence to the second end 8b of the sleeve 11. In FIGS. 6a and 6b, an aperture 18 on sleeve 11 in which the ferrule 9 can be attached to by known techniques is also visible.

Additionally, a lens 14 is positioned inside the sleeve 11 between its first and second end 8a, 8b. The position of the lens 14 in the collimator 7 is chosen so that its focus is located on the face end of the pigtail 10. The lens 14 changes the parallel laser beam into a convergent beam which can be coupled into the fibre F. Preferably, lens 14 is a GRIN lens, however any type of lens can be used as long as it can focus a beam having a given mode field diameter (MFD). In the preferred embodiment, for example, the MFD is 450 μm.

Optionally, the collimator 7 further includes an optical isolator 17 placed inside the sleeve 11 between its first and second end 8a, 8b.

The fibre F, the pigtail 10 of which is inserted in the ferrule 9, is preferably a single-mode transmission fibre, e.g., a silica fibre comprising a core region of 8-9 micron of diameter. More preferably, the fibre is a Polarization-maintaining and Absorption reducing Fibre (PANDA).

Placed between the laser containing package 3 and the collimator 7, the optical assembly 1 further includes a joint element 20, to opposite surfaces 22a, 22b of which the package 3 and collimator 2 are attached.

The joint element 20, represented in details in FIGS. 7a and 7b, is a mechanical structure having a through-hole 21 through which the laser beam LB emerging from the package 3 passes. To take into account the possible residual divergence of the laser beam, the preferred geometry of the through hole 21 is a diverging one. "Diverging hole" means in the following that the dimensions of the cross-section of the hole 21 through a plane perpendicular to the hole's axis increases going from the first surface 22a to the second surface 22b. This geometry minimizes the possibility of interception of the beam by the hole's wall.

The first surface 22a of the joint element has a geometry such that it mates with the outer surface of the wall 4a of the package 3 and it is in abutment with the same. Similarly, the second surface 22b has a geometry such that it mates with a portion of the surface of the sleeve 11 in correspondence of its first free end 8a, as described in the following.

Preferably, the first surface 22a is a planar surface, more preferably an annular planar surface. In this preferred embodiment, the contact between the planar outer surface of the wall 4a and the first surface 22a of the joint element 20, having a planar geometry is such that the contact between the surfaces is maximised. The areas of the first surface 22a and wall 4a which are in mutual contact are called first contact area.

According to a preferred embodiment of the invention, the contact between the first surface 22a of the joint member 20 and the package 3 is made in a location such that the aperture 5 and the through-hole 21 overlap. Preferably, the area of the through hole 21 cross section at the first surface is larger than that of the aperture 5, so that the joint element 20 does not interfere with the beam propagation. The first contact area is in this preferred embodiment an annular area. The two surfaces (outer surface of wall 4a and surface 22a) are fixed by laser welding.

The second surface 22b comprises a convex surface 23 pointing outwards. Preferably, the centre of curvature of the convex surface 23 is approximately centred upon the laser beam LB coming out of the package 3 through aperture 5.

Preferably, the radius R of curvature of the convex surface 23 is greater than or equal to the inner radius of the cylindrical sleeve 11.

Preferably, the convex surface 23 is a portion of a spherical surface. Even more preferably, the convex surface 23 is a hemispherical surface with a removed "top" due to the hole 21 presence. The axis of the hole 21 and the axis of the hemisphere preferably coincide. Preferably, the centre of curvature of the hemispherical surface 23 and the centre of the annular surface 22a coincide.

Preferably, the second surface 22b also comprises an annular flat surface 24 surrounding the convex surface 23.

In a preferred embodiment of the invention, the joint element 20 includes a flange 12, a surface of which is in abutment with wall 4a (and thus the first surface 22a coincides with one of the flange surfaces; the flange second surface coincides with planar surface 24). More preferably, on the flange 12 an hemisphere is mounted and a through hole 21 is realized having an axis which coincides with the hemisphere axis.

By way of an example, the diameter of the hole 21 cross section at the first surface 22a is equal to 2.6 mm. In the cross section of FIG. 7b, the angle formed between the hole 21 wall and the longitudinal axis of the joint element 20 is equal to 5°. The thickness of the flange 12 is equal to 0.3 mm.

The radius of the hemisphere 23 is equal to 3.8 mm.

A portion of the convex surface 23 is inserted in the sleeve 11 of the collimator 7 through its first end 8a. The penetration is terminated when abutment is achieved. Indeed, the respective dimensions of sleeve 11 and convex surface 23 are so chosen that this partial insertion is possible. A second contact area is defined, which is the portion of the convex surface and the portion of the surface of the sleeve which are in physical contact.

The insertion is facilitated and a better abutment is achieved when the preferred embodiment in which the flare 15 is realized on the collimator sleeve 11 is considered.

The collimator and joint element are fixed by laser welding in such a way that the axis of the collimator is substantially aligned with the laser beam LB (see FIG. 8b).

In order to obtain the optical assembly above described, the following process according to the invention is followed.

Figure 9:
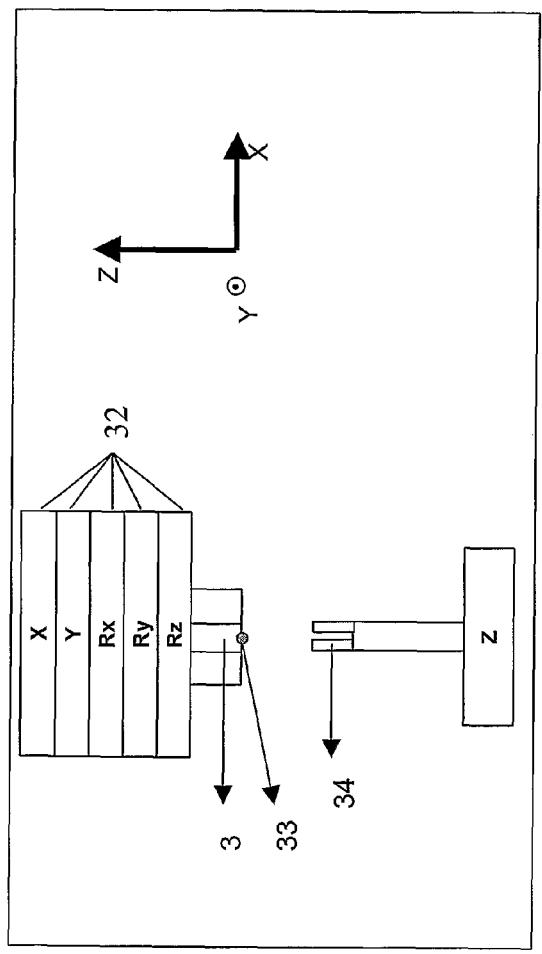
FIGS. 9 and 10 represent two additional steps of the method of the invention.
Figure 10:
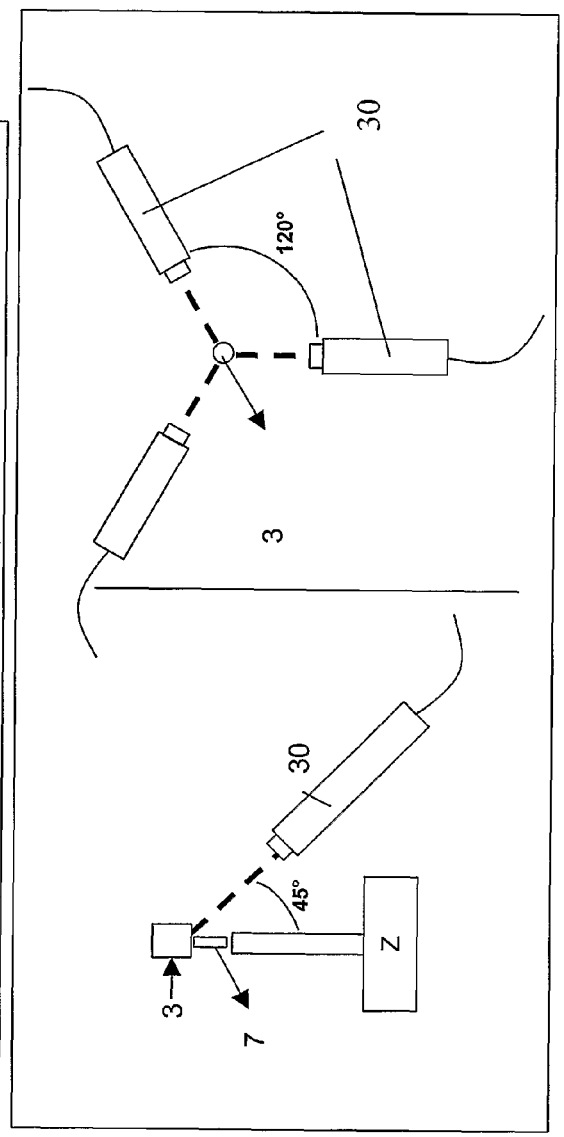

The package 3, the joint element 20 and the collimator 7 are pre-placed onto pallets included in a laser welding workstation (shown only partially in FIGS. 9 and 10).

The components in the pallets are then loaded in the workstation. In FIG. 9, the rectangular boxes 32 represent the motorized stages of the workstation. Their pivot-point 33 preferably coincides with the centre of curvature of the convex surface 23.

Preferably, the package 3 is loaded such that its axis Z is disposed vertically, with aperture 5 on the upper surface. See for example FIG. 8a in which this configuration is depicted.

The joint element 20 with surface 22a facing the wall 4a and the collimator 7 are then actively aligned to the beam emerging from the package 3. Movements of the joint element 20 along the X and Y axes are made, so that the through-hole 21 is centred on the beam path BP (which is depicted as a dashed line on FIG. 8a). These movement are allowed thanks to the mating between the geometries of the first surface 22a and the wall 4a. The beam path BP may be along the Z axis or it may have an angle with respect to it, as shown in FIG. 8a. In case of such a tilt, the collimator 7 is rotated along the X, Y, Z axes till it is aligned with the beam path (its axis follows the beam path). This variation in configuration is shown in FIG. 8a (no alignment) and FIG. 8b (alignment is achieved). Due to the geometry of the convex surface 22b, it is possible to align the collimator 7 through rotations of the same around the different axes thanks to the sliding of a portion of the inner surface 12a of sleeve 11 onto the convex surface 23. The preferred tapered surface 15 realized on the sleeve 11 increases the tangential contact between the joint element 20 and the sleeve 11. In this case, the second contact area is a portion of the tapered surface.

The preferred configuration in which the convex surface 23 partially penetrates inside the hole 13 defined by the sleeve 11 allows a wide range of possible respective angular positioning between joint element 20 and collimator 7. In particular, angle of 15° can be achieved. Depending on the physical dimensions chosen, the penetration can be more or less marked. Additionally, the penetration configuration allows a better mechanical stability.

In this alignment step, the joint element 20, collimator 7 and package 3 are preferably not in contact with each other and a gap of few millimeters in present therebetween.

At the end of the alignment, a translation along the Z-axis is made, till the joint element 20 is brought into contact with the wall 4a. In the preferred planar geometry of the wall 4a and of the first surface 22a, when abutment is achieved, the mutual contact of the two surfaces is air-gap free.

In case alignment is lost due to the abutment of the joint element 20 onto the package 3, an additional fine alignment step is preferably provided.

The fixing of the package 3—joint element 20—collimator 7 is made by two laser welding steps. In the first step, the joint element 20 is fixed on the package 3: welding spots are preferably made at about the interface between the first surface 22a and the wall 4a. Preferably, the spots are made symmetrically with respect to the Z axis to reduce the arise of post-weld-shift and to minimize excess loss.

Preferably, three simultaneous spots are welded and are realized using three laser welding heads 30 (see FIG. 10) disposed coaxially. Preferably, the three spots are made at 120° one from the others around the Z axis. However any number of welding spots is envisaged in the process of the present invention, depending from the number of welding head available in the workstation used. In addition, the angle formed between the laser welding beam emerging from the laser welding head 30 and the Z axis is preferably of about 45° (see FIG. 10).

Preferably the welding spots realized to join the elements of the assembly are the so-called "lap welding" joints. A lap joint is where two materials are to be joined by welding through one into the other. Therefore, preferably the joint element comprises the flange 12, so that these lap joints are possible: the welding spot is made on the flange 12 (in particular on the surface 24) and the fused material penetrates on the package wall 4a.

In case this first welding step slightly worsens the alignment, an extra fine-aligning phase is carried out.

The second welding step is made in a substantially analogous way than the first one step.

The assembled configuration is shown in FIG. 8b in which black dots represent the welding spots 31. Figure is not to scale and the dimensions of the spots 31 are clearly exaggerated for sake of clarity. FIG. 8a also shows the alignment of the collimator 7 with the laser beam LB.

If necessary for the assembly final use, a sealing phase may be performed after the welding process outlined above, in order to seal the whole assembly. This phase comprises a sequence of low-power laser spots around the contact areas of the joint element (i.e. first in the contact area between joint element and package and thus between joint element and collimator).

By way of example, a suitable laser welding workstation used in the above mentioned process has the following characteristics:
Pulsed Nd/Yag laser (e.g. laser Trumph HL22P) at a wavelength of 1064 nm, having a maximum energy of 30 J. The pulse power ranges from 300 W to 3 KW. The laser also includes a pulse profile editor;
An energy sharing system having three fibres is included to deliver radiation to the workstation. A single laser pulse may be divided into three equal portions and focused into three different fibres. The balancing power error does not exceed 1%. The core of the used fibres is equal to 200 μm and their length is equal to 4 m.
The workstation comprises three weld-head having a focal length of 135 mm and a housing for the vision system. The welding spot in the focusing point has a diameter of 300 μm.
Automated linear positioning\for the heads.
Three independently controlled shutters are also comprised, a shutter located in front of each weld-head, which allow radiation emission from one, two or three heads according to the selection made.
The laser may be controlled and programmed through a PC.

Such an assembly achieves excess loss of less than 0.1 dB.

The invention claimed is:

1. An optical assembly comprising:
an optical package having a wall with an aperture and comprising a laser device capable of emitting a laser beam through the aperture;
a collimator comprising a sleeve defining a first end and a second end, said collimator comprising a terminating portion of an optical fibre; and
a joint element having a first and a second surface, said first surface contacting the wall around the aperture in a first contact area, and said second surface comprising a convex surface contacting a portion of the surface of said sleeve in correspondence of its first end in a second contact area, said convex surface being at least partially inserted in said sleeve, so that said collimator is aligned with respect to said laser beam,
wherein said joint element comprises a through-hole which overlaps said aperture, and wherein said through-hole has circular cross-section and a diameter of said cross section increases going from the first surface toward the second surface.

2. The optical assembly according to claim 1, wherein the package comprises a collimating lens so that the laser beam at the aperture is a collimated laser beam.

3. The optical assembly according to claim 1, wherein said collimator is a pre-assembled collimator.

4. The optical assembly according to claim 1, wherein said collimator comprises a focusing lens to couple said laser beam onto said fibre.

5. The optical assembly according to claim 1, wherein said sleeve is cylindrical.

6. The optical assembly according to claim 1, wherein said first surface of said joint element is flat.

7. The optical assembly according to claim 6, wherein said first surface is an annular surface.

8. The optical assembly according to claim 1, wherein said convex surface is a portion of a spherical surface.

9. The optical assembly according to claim 1, wherein said first end of said sleeve comprises a tapered portion, said second contact area being in correspondence of said tapered portion.

10. The optical assembly according to claim 9, wherein said tapered portion is a frusto-conical surface.

11. The optical assembly according to claim 1, wherein said joint element comprises a flange, said flange comprising said first surface.

12. The optical assembly according to claim 1, wherein said second surface comprises a flat surface radially extending from said convex surface.

13. The optical assembly according to claim 1, wherein said through-hole defines a longitudinal axis, said axis being coincident with an axis of said curved surface.

14. The optical assembly according to claim 1, wherein said collimator comprises an optical isolator located between said first end and said second end.

15. The optical assembly according to claim 1, wherein the radius of curvature of the curved convex second surface is greater than or equal to the inner radius of said sleeve.

16. The optical assembly according to claim 1, wherein said collimator comprises a ferrule in correspondence with said second end from which said terminating portion of said fibre departs.

17. The optical assembly according to claim 1, wherein said laser is a tunable laser.

18. The optical assembly according to claim 1, wherein said laser is an external cavity tunable laser.

19. The optical assembly according to claim 17, wherein a tunable element of said laser is a tunable mirror.

20. The optical assembly according to claim 1, wherein said optical package is a butterfly package.

21. The optical assembly according to claim 1, wherein said optical package has a box-like shape.

22. An optical assembly comprising:
an optical package having a wall with an aperture and comprising a laser device capable of emitting a laser beam through the aperture;
a collimator comprising a sleeve defining a first end and a second end, said collimator comprising a terminating portion of an optical fibre; and
a joint element having a first and a second surface, said first surface contacting the wall around the aperture in a first contact area, and said second surface comprising a convex surface contacting a portion of the surface of said sleeve in correspondence of its first end in a second contact area, said convex surface being at least partially inserted in said sleeve, so that said collimator is aligned with respect to said laser beam,
wherein said optical package defines a first longitudinal axis, said wall being perpendicular to said axis, said collimator defining a second longitudinal axis and said first and second longitudinal axis forming an angle with respect to each other, said second longitudinal axis being aligned with said laser beam.

23. The optical assembly according to claim 1, wherein said fibre is a polarization-maintaining and absorption reducing fibre.

24. The optical assembly according to claim 1, comprising a plurality of welding spots located at about the interface between said wall and said first surface of said joint element.

25. The optical assembly according to claim 1, comprising a plurality of welding spots located at about the interface between said second surface of said joint element and said sleeve.

26. The optical assembly according to claim 13, wherein said through-hole forms an angle of 5 degrees with respect to the longitudinal axis of the joint element.

* * * * *